(12) United States Patent
Kavoosi

(10) Patent No.: US 9,557,581 B2
(45) Date of Patent: Jan. 31, 2017

(54) EYEWEAR DESIGN KIT WITH CUSTOMIZABLE, ERASABLE AREA

(71) Applicant: Damon Parker, Escondido, CA (US)

(72) Inventor: Jordan Lee Kavoosi, Farmington, MN (US)

(*) Notice: Subject to any disclaimer, the term of this patent is extended or adjusted under 35 U.S.C. 154(b) by 0 days.

(21) Appl. No.: 14/867,777

(22) Filed: Sep. 28, 2015

(65) Prior Publication Data

US 2016/0091736 A1    Mar. 31, 2016

Related U.S. Application Data

(60) Provisional application No. 62/057,234, filed on Sep. 30, 2014.

(51) Int. Cl.
  *G02C 11/02*    (2006.01)
  *G02C 5/00*     (2006.01)

(52) U.S. Cl.
  CPC ............ *G02C 11/02* (2013.01); *G02C 5/008* (2013.01); *G02C 2200/02* (2013.01); *G02C 2200/08* (2013.01)

(58) Field of Classification Search
  CPC ...................................... G02C 11/02
  USPC .......................... 351/51, 52, 158, 41
  See application file for complete search history.

(56) References Cited

U.S. PATENT DOCUMENTS

| | | | |
|---|---|---|---|
| 2006/0256279 A1* | 11/2006 | Amioka | G02C 5/08 351/41 |
| 2012/0013841 A1* | 1/2012 | Montsaroff | B44C 1/00 351/51 |

* cited by examiner

*Primary Examiner* — Hung Dang
(74) *Attorney, Agent, or Firm* — Dale J. Ream

(57) ABSTRACT

A reconfigurable eyewear assembly includes a frame member having left and right socket portions each having a generally circular rim defining an interior void, respectively, and being connected by a bridge portion, the left and the right socket portions having a temple connector extending rearwardly from a respective rim. The eyewear assembly includes a pair of temple members having proximal and distal ends, respectively, each proximal end being selectively coupled to a respective temple connector. A coating material is applied to at least a portion of one of the frame member or the temple members, the coating material including one of a whiteboard and a chalkboard.

21 Claims, 7 Drawing Sheets

EYEWEAR DESIGN KIT WITH CUSTOMIZABLE, ERASABLE AREA

REFERENCE TO RELATED APPLICATION

This non-provisional patent application claims the benefit of Provisional application Ser. No. 62/057,234 filed on Sep. 30, 2014 titled "Eyewear Design Kit Including Eyewear With Customizeable, Erasable Area For Unlimited Self-Expression".

BACKGROUND OF THE INVENTION

This invention relates generally to eyewear and, more particularly, to an eyewear device that may be customized so as to render a different aesthetic appearance, a desired expression of the wearer's personality, or to satisfy a whim or cultural trend.

Sunshades and other eyewear are very popular with children and adults and, after an initial purchase, they provide significant enjoyment as well as protection from harsh sunlight. However, after a period of time, the enjoyment level declines for many users who are always eager from something new. Unfortunately, the current eyewear industry limits the creative voice of the eyewear and sunglass consumer by producing pre-designed eyewear and not providing an option to change the appearance without purchasing new eyeglasses altogether.

Therefore, it would be desirable to have an eyewear design kit having an eyewear device having customizable and erasable areas. Further, it would be desirable to have an eyewear design kit having one or more chalk devices adapted to apply a chalk coating to a chalkboard or whiteboard surface on the eyewear device.

SUMMARY OF THE INVENTION

A reconfigurable eyewear assembly according to the present invention includes a frame member having left and right socket portions each having a generally circular rim defining an interior void, respectively, and being connected by a bridge portion, the left and the right socket portions having a temple connector extending rearwardly from a respective rim. The eyewear assembly includes a pair of temple members having proximal and distal ends, respectively, each proximal end being selectively coupled to a respective temple connector. A coating material is applied to at least a portion of one of the frame member or the temple members, the coating material including one of a whiteboard and a chalkboard. The coating material is configured and adapted to receive a chalk material thereon so as to display user imparted indicia as an artistic expression for personal enjoyment.

Therefore, a general object of this invention is to provide reconfigurable eyewear assembly having a frame member and temple members that include a coating material on which a chalk material may be applied.

Another object of this invention is to provide a reconfigurable eyewear assembly, as aforesaid, having customizable and erasable areas.

Still another object of this invention is to provide a reconfigurable eyewear assembly, as aforesaid, in which the coating material is one of a chalkboard surface and a whiteboard surface.

Yet another object of this invention is to provide a reconfigurable eyewear assembly, as aforesaid, in a kit arrangement having a towelette configured to clean chalk marker material off of the eyewear device.

Still another object of this invention is to provide a reconfigurable eyewear assembly, as aforesaid, in a kit arrangement including one or more chalk devices.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a side view of the temple member as in FIG. 3a;

DESCRIPTION OF THE PREFERRED EMBODIMENT

An eyewear design kit with customizable, erasable area according to a preferred embodiment of the present invention will now be described with reference to FIGS. 1 to 7 of the accompanying drawings. The eyewear design kit includes an eyewear device 10 having a frame member and temple members 20 with customizable, erasable areas.

The eyewear design kit has a primary element of an eyewear device 10. The eyewear design kit may in some embodiments be referred to as a reconfigurable eyewear assembly. In both embodiments, an eyewear device 10 includes a coating material 12 applied and attached to a portion of the eyewear device 10. Preferably, the coating material is a chalkboard surface material configured to receive, maintain, and display a chalkboard marker material later selectively imparted thereon, such as by a chalk dust device as will be described in more detail later. In an embodiment, the coating material is a whiteboard surface material configured to receive, maintain, and display a chalkboard marker material selectively applied thereto, such as by a liquid chalk marker as will be described in more detail later.

Figure 1:
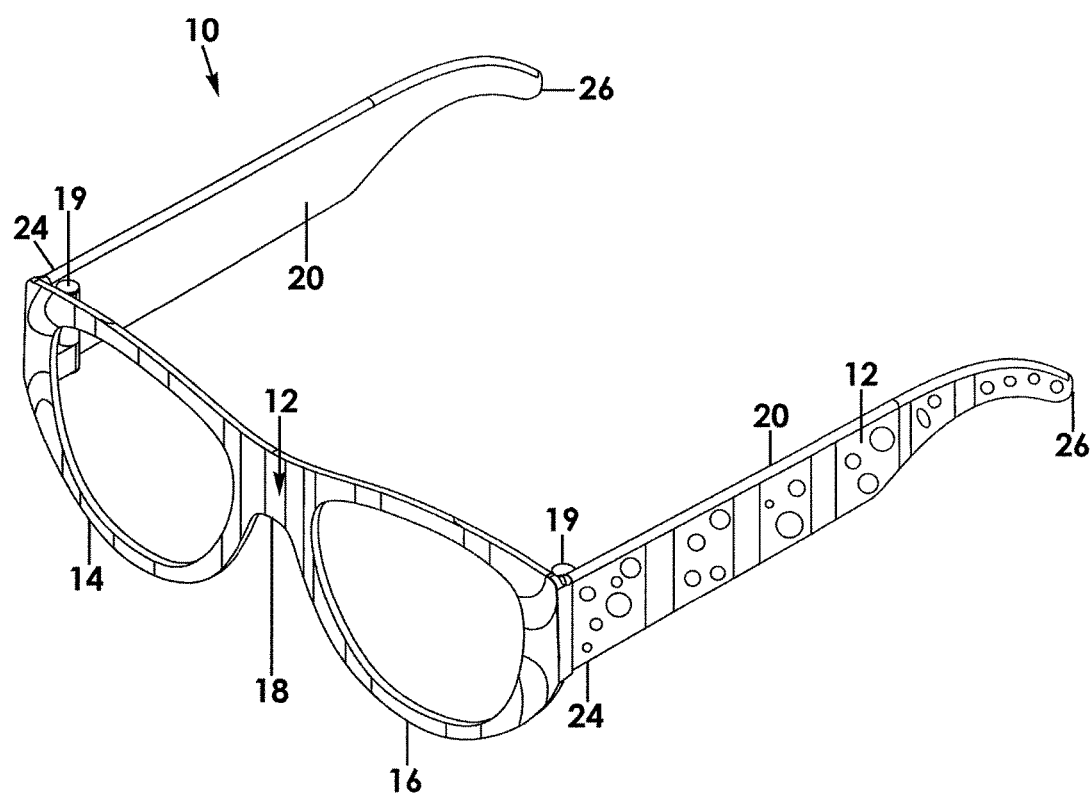
FIG. 1 is a perspective view of an eyewear device according to a preferred embodiment of the present invention.
Figure 2B:
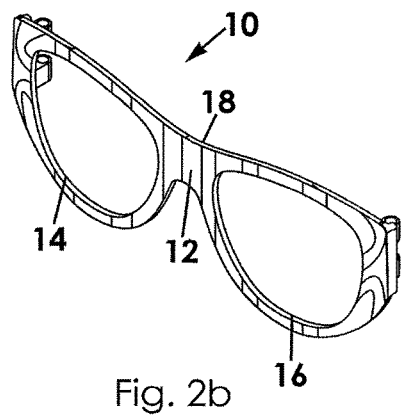
FIG. 2b is a front perspective view of the eyewear device as in FIG. 1.
Figure 2C:
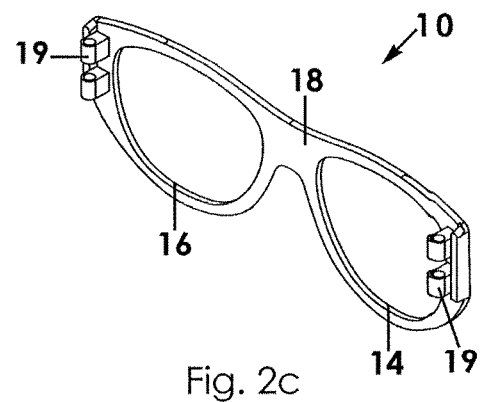
FIG. 2c is a rear perspective view of the eyewear device.
Figure 2A:
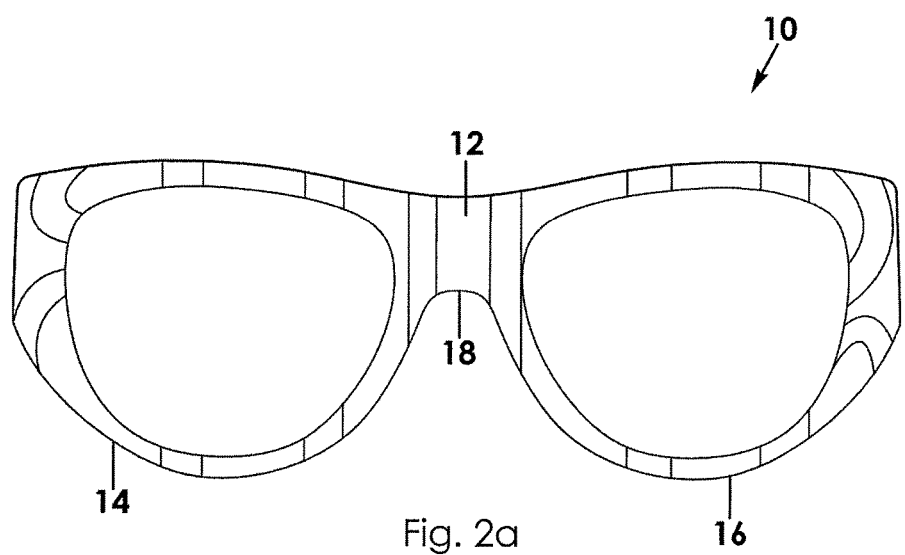
FIG. 2a is a front view of the eyewear device as in FIG. 1.
Figure 3B:
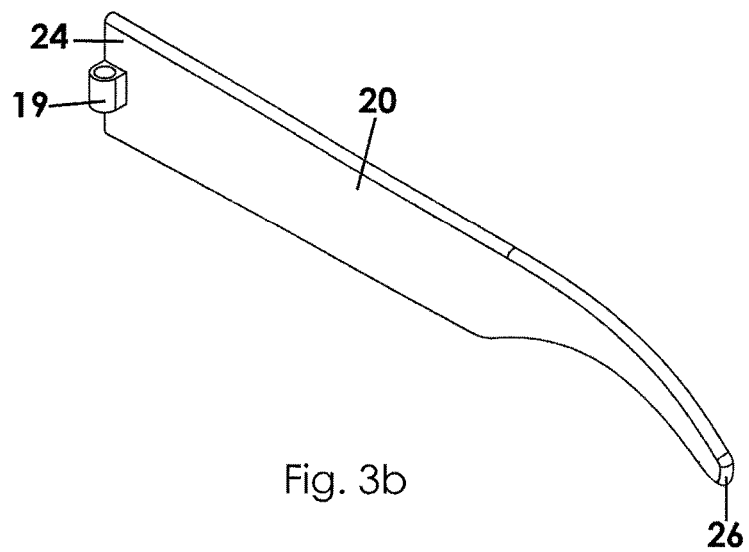
Figure 3A:
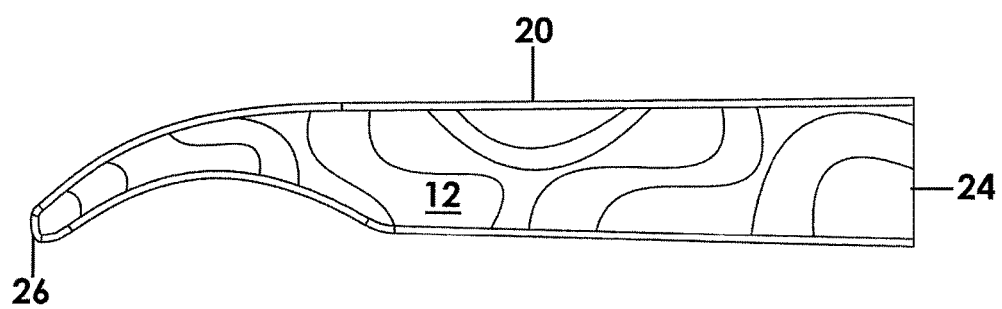
FIG. 3a is a perspective view of a temple member of a frame portion of the eyewear device as in FIG. 1.

The eyewear device 10 may include a frame member having a left socket portion 14 and a right socket portion 16 adjacent thereto (FIG. 1). It is understood that the socket portions are configured to receive generally transparent plastic, glass, or plexiglass lenses or, in some embodiments, no lenses at all. The socket portions may include a bridge portion 18 connecting the socket portions to one another. A temple connector 19 may extend rearwardly from a side edge of each respective socket portion 14, 16. In addition, the eyewear device 10 may include a pair of temple members 20, each temple member 20 having a proximal end 24 coupled to a respective temple member 20. In an embodiment, each temple member 20 may be removably coupled to a respective temple connector 19 so as to be interchangeable with a temple member 20 having a different shape, appearance, color, or design configuration. Each temple member 20 includes a distal end 26 opposite an associated proximal end 24, the distal end 26 being a free or terminal end. The distal end 26 represents that part of the temple member 20 that engages or rests upon the ear of a user wearing the eyewear device 10 on his head.

One or both of the socket portions 14, 16 of the frame member include an outer surface having the coating material 12 adhered thereto or impregnated into its constructed material. Similarly, the temple members 20 include respective outer surfaces having the coating material 12 adhered thereto or impregnated into its constructed material. In an embodiment, only the socket portions 14, 16 or only the temple members 20 include the coating material while in another embodiment, all outer surfaces of the eyewear device 10 are covered, completely or partially, with the coating material 12.

In an embodiment, each temple member 20 includes an enlarged area 22 covered by the coating material 12. In other words, the temple members 20 have an area particularly suited to receive markings by a chalk device 30 upon the coating material 12, such as indicia created by a user, e.g. text, graphics, color applications, lines, symbols, or the like.

As the coating material 12 may be a chalkboard surface or a whiteboard surface, the eyewear design kit or eyewear assembly may include chalk devices 30 specifically adapted to apply a material upon the coating material 12. For instance, a chalk device 30 in the nature of chalkboard chalk, sidewalk chalk, a liquid chalk marker 32, or the like may be packaged and marketed in combination with the eyewear device 10 and then applied to the coating material as desired by a consumer once purchased and unpackaged.

Figure 4:
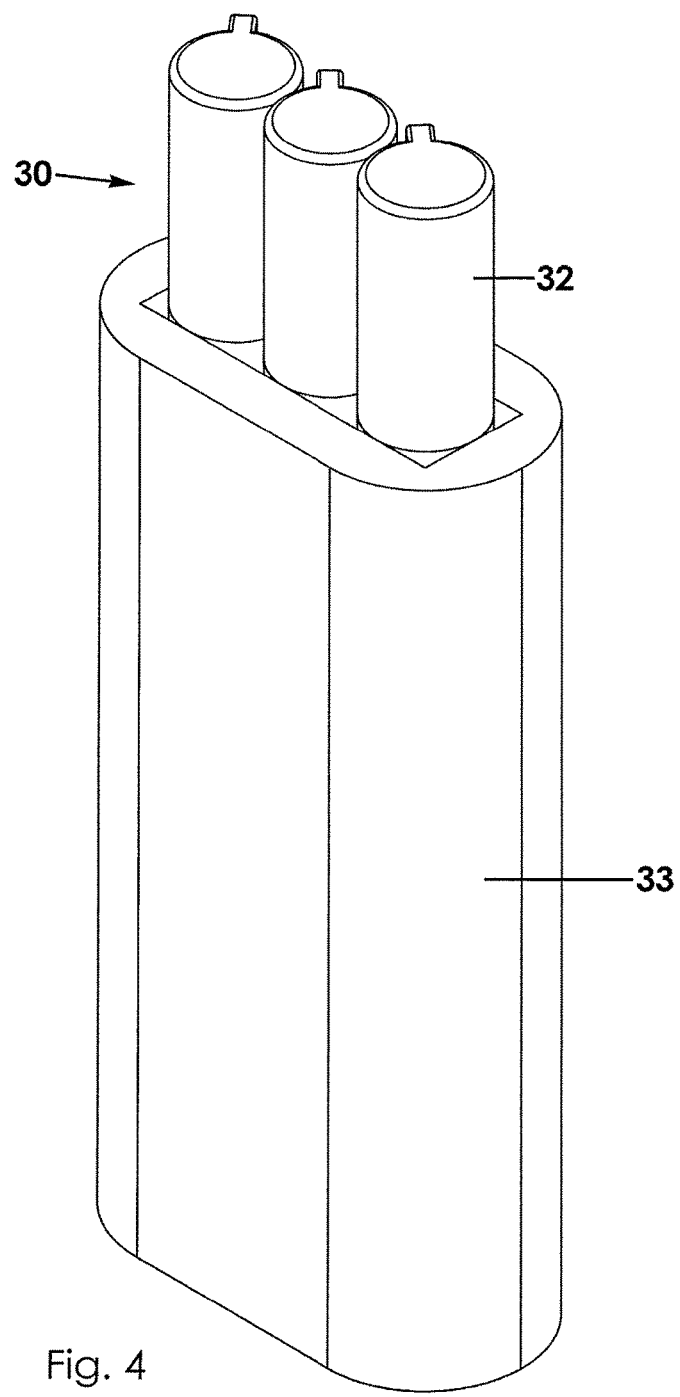
FIG. 4 is a perspective view of a package of a plurality of liquid chalk markers.
Figure 5A:
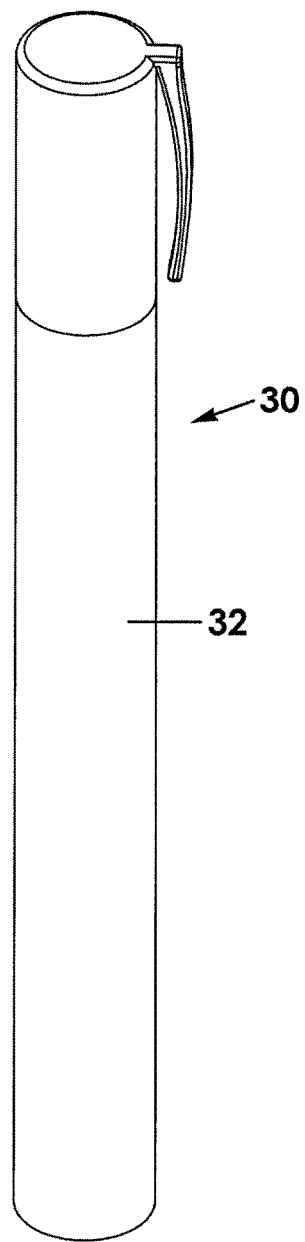
FIG. 5a is a perspective view of a liquid chalk marker, illustrated with a lid in a closed configuration.
Figure 5B:
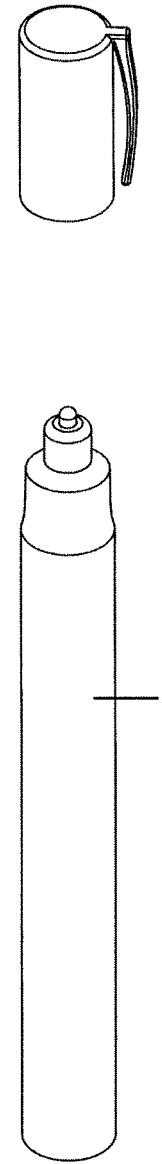
FIG. 5b is another perspective view of a liquid chalk marker illustrated with a lid exploded from the eyewear device.
Figure 6:
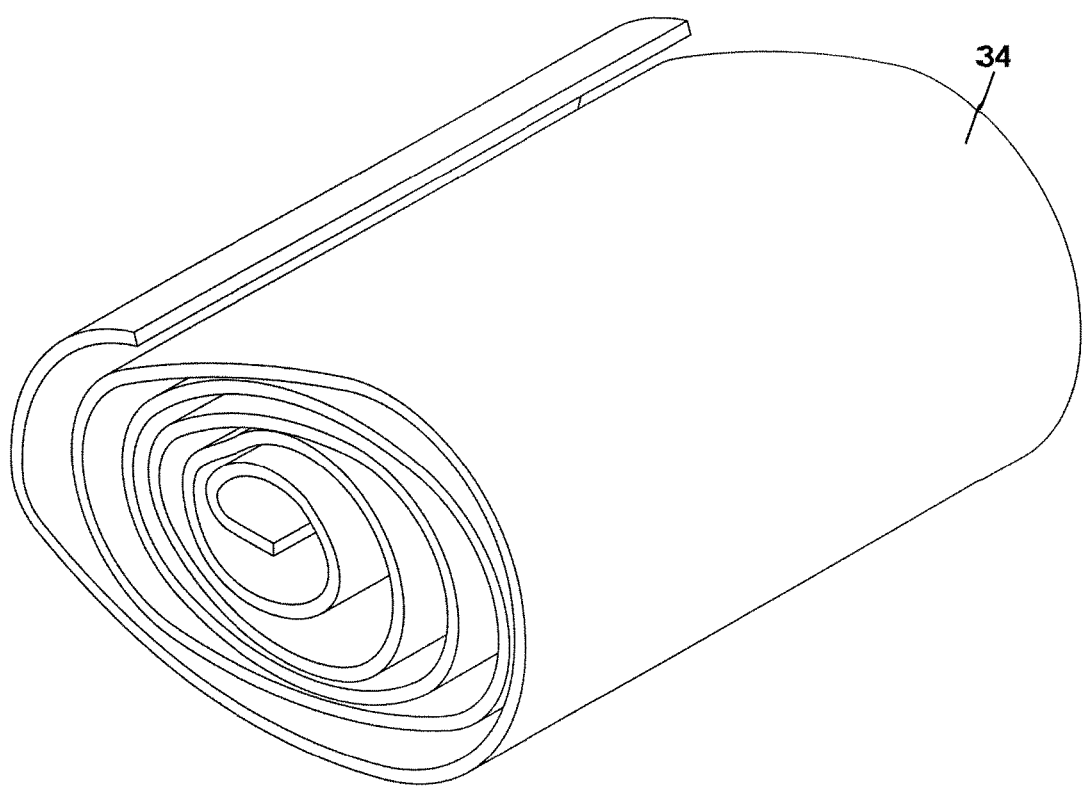
FIG. 6 is a perspective view of a moist towelette illustrated in a fully rolled up configuration.
Figure 7:
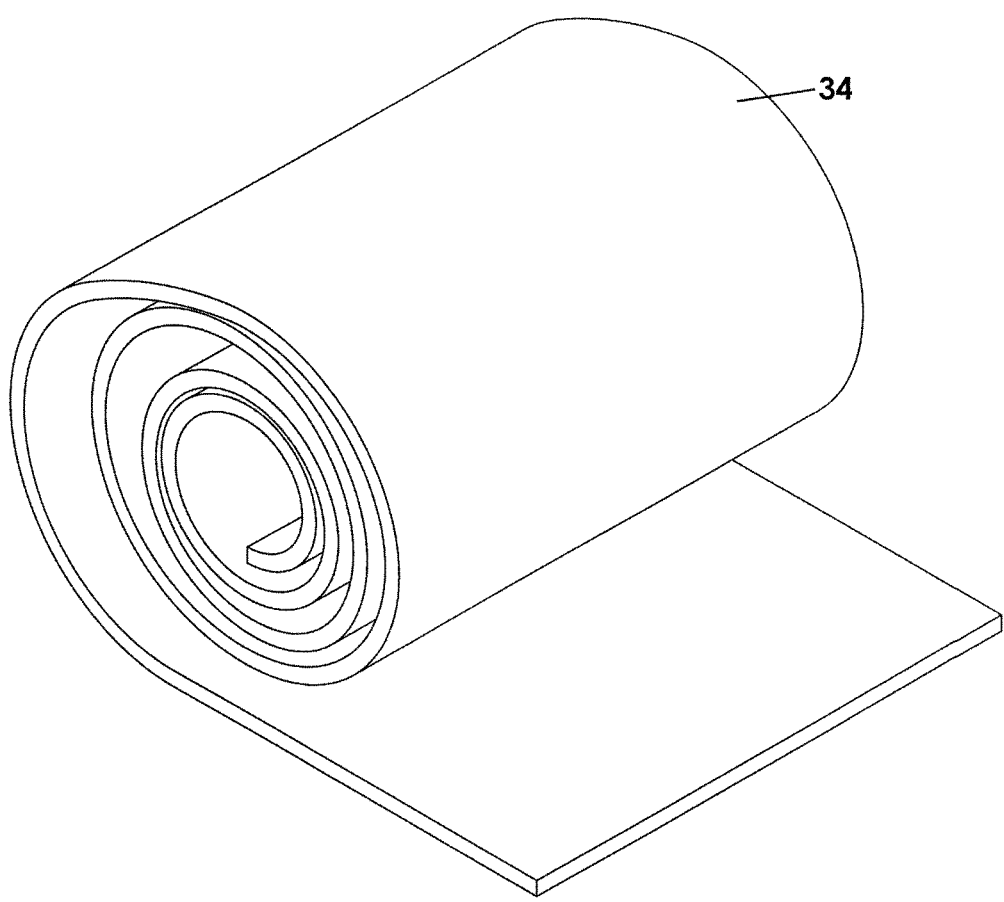
FIG. 7 is another perspective view of the moist towelette as in FIG. 6 illustrated in a partially rolled up configuration.

In addition, the eyewear design kit may include one or a plurality of liquid chalk markers 32. The plurality of chalk markers 32 may be included in its own marker container 33 or packaging (FIG. 4). In addition, the eyewear design kit may include a moist towelette 34 that includes a surface material and a chemical that is configured to remove chalk material (dust) or marker residue (erasable ink) from the coating material 12. In other words, the chalk-imparted designs applied by a consumer may be removed and erased easily by the consumer so that new ones may be applied. In an embodiment, the towelette 34 may be a cloth or sponge that can be moistened by water as needed by the consumer. In an embodiment, the eyewear design kit may include a container of chalk dust (not shown) for conditioning or decorating the coating material before applying other chalk markings, say, liquid chalk marker ink. The eyewear design kit may also include a set of printed instructions (not shown) regarding how to use items in the kit, showing example designs, or the like.

In an embodiment, at least one liquid chalk marker 32 may include a coated phosphorescent pigment that is configured to glow in the dark once applied upon the coating material. In some formulations, the pigment may respond best and be most vivid when exposed to black light. Therefore, this form of liquid chalk marker might only be used in special circumstances when the eyewear device 10 is to be worn at night or, for example, at a Halloween party where black lighting is in use.

In another embodiment, the material coating described above may be a magnetic coating. The eyewear design kit, then, may include a plurality of ferromagnetic charms (not shown) selectively mounted to the magnetic coating. This is just another means by which the eyewear device may be reconfigured or customized by a consumer.

In another aspect of the invention, a website may be included for ordering and purchasing customized and customizable eyewear design kits in the nature of the above descriptions. Preferably, the website includes a graphical user interface ("GUI") for configuring and purchasing an eyewear kit. The GUI may include a first display region for display on a display device (e.g. a consumer's computer monitor), the first display region configured to display at least one representation of an eyewear device. The interface also includes a first selection feature configured to display on the display device concurrently with and adjacent to the first display region and configured to allow user selection of an aspect of the representation of the displayed eyewear. Further, a second display region is configured to display concurrently with and adjacent to the first display region at least one representation of a set of one or more markers configured for marking on a surface of the eyewear. A second selection feature is configured to display on the display device concurrently with and adjacent to the second display region and configured to allow user selection of an aspect of the representation of the set of markers. Finally, the interface may include a user-selectable ecommerce feature for invoking display of a first ecommerce display region configured in response to the first and second selection features to display a first representation of the selected aspect of the displayed eyewear and a second representation of the selected aspect of the displayed marker, with the first and second representations displayed adjacent to a price.

More specifically, the first ecommerce display region is configured to display a user selectable checkout or purchase button configured to invoke upon selection the display of a second ecommerce display region configured to allow input of shipping and/or credit card information and to enable user selection of an option to complete purchase of an assembly or kit including a physical embodiment of the eyewear and a physical embodiment of the set of markers.

In an embodiment, the user-selectable ecommerce feature allows one-click purchase of a kit including the eyewear configured according to the first selection feature and the set of markers configured according to the second selection feature. In addition, the interface may include a combination icon element configured to be displayed concurrently with and between the first and second display regions to indicate combination of the eyewear and the set of one or more markers.

In use, an eyewear device 10 comes with respective outer surfaces coated with the coating material. In some embodiments (e.g. a kit), one or more marker devices 32 may include a chalk material—such as ink or chalk dust or the like—that adheres to the coating material 12. For instance, a user may impart alphanumeric or graphic indicia onto the temple members as an expression of one's personality, loyalty to a team or organization, or the like. If desired, the chalk marker material may be erased from the frame elements, such as with a towel and water or chemical, and new creative markings may be posted, such as with or in association with an organization, team, or school.

It is understood that while certain forms of this invention have been illustrated and described, it is not limited thereto except insofar as such limitations are included in the following claims and allowable functional equivalents thereof.

The invention claimed is:

1. An eyewear design kit, comprising:
   an eyewear device having a coating material on at least a portion thereof, said coating material taken from a group including one of a whiteboard and a chalkboard; and
   at least one liquid chalk marker configured to selectively impart a chalk material on said coating material.

2. The eyewear design kit as in claim 1, wherein said eyewear device includes:
   a frame member having left and right socket portions each having a generally circular rim defining an interior void, respectively, and being connected by a bridge portion, said left and said right socket portions having a temple connector extending rearwardly from a respective rim;
   a pair of temple members having proximal and distal ends, respectively, each proximal end being selectively coupled to a respective temple connector.

3. The eyewear design kit as in claim 2, wherein each temple member includes an outer surface having said coating material thereon.

4. The eyewear design kit as in claim 3, further comprising a container having a plurality of liquid chalk markers, each liquid chalk marker being configured to selectively impart liquid chalk material atop said coating material.

5. The eyewear design kit as in claim 4, further comprising a towelette that includes a surface material and a chemical configured to selectively remove said chalk material from said coating material situated on said eyewear device.

6. The eyewear design kit as in claim 3, wherein each said temple member includes an enlarged area having said coating material thereon for displaying a user-applied chalk indicia thereon.

7. The eyewear design kit as in claim 3, further comprising a container of chalk dust for conditioning the chalkboard coating to receive chalk markings.

8. The eyewear design kit as in claim 3, wherein said eyewear device is a pair of sunshades having a temple member that includes an enlarged area having a portion of said coating material situated thereon for displaying a user imparted chalk design.

9. The eyewear design kit as in claim 3, further comprising a set of printed instructions and one of a cloth or sponge.

10. The eyewear design kit as in claim 2, wherein said left and right socket member includes an outer surface, respectively, having said coating material thereon.

11. The eyewear design kit as in claim 1, wherein said at least one liquid chalk marker includes a coated phosphorescent pigment configured to glow in the dark or when exposed to a black light.

12. The eyewear design kit as in claim 1, wherein at least a portion of said eyewear device is coated with a magnetic coating, said eyewear design kit including a plurality of ferromagnetic charms selectively mounted to said magnetic coating of said eyewear device so as to provide reconfigurable art eyewear.

13. A reconfigurable eyewear assembly, comprising:
    a frame member having left and right socket portions each having a generally circular rim defining an interior void, respectively, and being connected by a bridge portion, said left and said right socket portions having a temple connector extending rearwardly from a respective rim;
    a pair of temple members having proximal and distal ends, respectively, each proximal end being selectively coupled to a respective temple connector; and
    a coating material on at least a portion of one of said frame member or said temple members, said coating material including one of a whiteboard and a chalkboard.

14. The reconfigurable eyewear assembly as in claim 13, wherein said coating material is configured to receive a chalk material thereon imparted from a chalk bearing device.

15. The reconfigurable eyewear assembly as in claim 14, wherein each temple member includes an outer surface having said coating material thereon and configured to selectively receive said chalk material atop said coating material.

16. The reconfigurable eyewear assembly as in claim 15, wherein each temple member includes an enlarged area having said coating material situated thereon and configured to selectively receive said chalk material atop said coating material.

17. The reconfigurable eyewear assembly as in claim 14, wherein said left and right socket members include an outer surface having said coating material thereon and configured to selectively receive said chalk material atop said coating material.

18. The reconfigurable eyewear assembly as in claim 14, wherein said chalk bearing device is taken from a group including liquid chalk markers, sidewalk chalk, chalkboard chalk, fluorescent liquid chalk markers, and erasable ink markers.

19. The reconfigurable eyewear assembly as in claim 13, further comprising a chalk bearing device taken from a group including liquid chalk markers, sidewalk chalk, and chalkboard chalk, and erasable ink markers, said chalk bearing device configured to selectively impart a chalk material atop said coating material.

20. The reconfigurable eyewear assembly as in claim 19, wherein said chalk bearing device includes a coated phosphorescent pigment configured to glow in the dark or when exposed to a black light.

21. The reconfigurable eyewear assembly as in claim 19, wherein at least a portion of said frame member or said left and said right socket is coated with a magnetic coating, said eyewear assembly including a plurality of ferromagnetic charms selectively mounted to said magnetic coating so as to provide reconfigurable art glasses.

* * * * *